United States Patent
Petrzilek et al.

(10) Patent No.: US 9,754,730 B2
(45) Date of Patent: Sep. 5, 2017

(54) LOW PROFILE MULTI-ANODE ASSEMBLY IN CYLINDRICAL HOUSING

(71) Applicant: AVX Corporation, Fountain Inn, SC (US)

(72) Inventors: Jan Petrzilek, Usti nad Orlici (CZ); Jiri Navratil, Veseli nad Moravou (CZ); Martin Biler, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 146 days.

(21) Appl. No.: 14/657,266

(22) Filed: Mar. 13, 2015

(65) Prior Publication Data

US 2016/0268055 A1    Sep. 15, 2016

(51) Int. Cl.
| | | |
|---|---|---|
| *H01G 9/15* | (2006.01) | |
| *H01G 9/08* | (2006.01) | |
| *H01G 9/032* | (2006.01) | |
| *H01G 9/028* | (2006.01) | |

(52) U.S. Cl.
CPC ............... *H01G 9/15* (2013.01); *H01G 9/08* (2013.01); *H01G 9/028* (2013.01); *H01G 9/032* (2013.01)

(58) Field of Classification Search
CPC ........ H01G 9/052; H01G 9/028; H01G 9/032; H01G 9/15; H01G 9/08
See application file for complete search history.

(56) References Cited

U.S. PATENT DOCUMENTS

| | | | | |
|---|---|---|---|---|
| 3,345,545 A | | 10/1967 | Bourgault et al. | |
| 3,346,783 A | * | 10/1967 | Millard | H01G 9/08 361/541 |
| 3,566,203 A | * | 2/1971 | Maguire | H01G 9/012 257/916 |
| 3,611,055 A | * | 10/1971 | Zeppieri | H01G 9/08 29/25.03 |
| 3,922,773 A | | 12/1975 | Marien et al. | |
| 4,009,425 A | * | 2/1977 | Muranaka | H01G 9/08 361/307 |

(Continued)

FOREIGN PATENT DOCUMENTS

| | | |
|---|---|---|
| EP | 1014400 | 6/2000 |
| GB | 1069685 | 8/1965 |

(Continued)

OTHER PUBLICATIONS

Abstract of Japanese Patent No. JP1140621 dated Jun. 1, 1989.

(Continued)

*Primary Examiner* — David M Sinclair
(74) *Attorney, Agent, or Firm* — Dority & Manning, P.A.

(57) ABSTRACT

A capacitor assembly configured to effectively dissipate heat when exposed to a high ripple current is provided. The assembly includes a plurality of capacitor elements, each including an anode body and lead, a dielectric layer overlying the anode body, and a solid electrolyte. A metal cylindrical housing having a lid and base, where the lid has a diameter in an −x direction and the metal cylindrical housing has a height in a −z direction, defines an interior cavity within which the plurality of capacitor elements are arranged about a central axis running along the −z direction. The ratio of the diameter to the height of the base ranges from about 1.5 to about 20. Further, the metal cylindrical housing is hermetically sealed.

21 Claims, 6 Drawing Sheets

(56) References Cited

U.S. PATENT DOCUMENTS

| | | |
|---|---|---|
| 4,085,435 A | 4/1978 | Galvagni |
| 4,107,762 A | 8/1978 | Shirn et al. |
| 4,479,168 A | 10/1984 | Green, Jr. |
| 4,546,415 A * | 10/1985 | Kent ............... H01G 9/00 361/511 |
| 4,755,908 A | 7/1988 | Gardner |
| 4,910,645 A | 3/1990 | Jonas et al. |
| 4,945,452 A | 7/1990 | Sturmer et al. |
| 4,959,430 A | 9/1990 | Jonas et al. |
| 5,111,327 A | 5/1992 | Blohm et al. |
| 5,198,968 A | 3/1993 | Galvagni |
| 5,300,575 A | 4/1994 | Jonas et al. |
| 5,314,606 A | 5/1994 | Irie et al. |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |
| 5,586,000 A | 12/1996 | Sakata et al. |
| 5,608,261 A | 3/1997 | Bhattacharyya et al. |
| 5,638,253 A | 6/1997 | Hasegawa |
| 5,694,287 A | 12/1997 | Nishiyama et al. |
| 5,729,428 A | 3/1998 | Sakata et al. |
| 5,812,367 A | 9/1998 | Kudoh et al. |
| 5,949,639 A | 9/1999 | Maeda et al. |
| 5,951,840 A | 9/1999 | Fukaumi et al. |
| 6,052,273 A * | 4/2000 | Inoue ............... H01G 9/10 361/523 |
| 6,188,566 B1 | 2/2001 | Aoyama |
| 6,191,936 B1 | 2/2001 | Webber et al. |
| 6,197,252 B1 | 3/2001 | Bishop et al. |
| 6,322,912 B1 | 11/2001 | Fife |
| 6,369,239 B2 | 4/2002 | Rauchschwalbe et al. |
| 6,391,275 B1 | 5/2002 | Fife |
| 6,416,730 B1 | 7/2002 | Fife |
| 6,445,566 B2 | 9/2002 | Watanabe et al. |
| 6,527,937 B2 | 3/2003 | Fife |
| 6,528,662 B2 | 3/2003 | Jonas |
| 6,576,099 B2 | 6/2003 | Kimmel et al. |
| 6,592,740 B2 | 7/2003 | Fife |
| 6,635,729 B1 | 10/2003 | Groenendaal et al. |
| 6,639,787 B2 | 10/2003 | Kimmel et al. |
| 6,674,635 B1 | 1/2004 | Fife et al. |
| 6,756,473 B2 | 6/2004 | Reuter et al. |
| 6,808,541 B2 | 10/2004 | Maeda |
| 6,819,546 B2 | 11/2004 | Kuriyama |
| 6,891,016 B2 | 5/2005 | Reuter et al. |
| 6,987,663 B2 | 1/2006 | Merker et al. |
| 7,102,016 B2 | 9/2006 | Reuter |
| 7,116,548 B2 | 10/2006 | Satterfield, Jr. et al. |
| 7,118,690 B2 | 10/2006 | Wessling et al. |
| 7,139,163 B2 | 11/2006 | Sawano |
| 7,154,740 B2 | 12/2006 | Merker et al. |
| 7,220,397 B2 | 5/2007 | Kimmel et al. |
| 7,262,511 B2 | 8/2007 | Osako et al. |
| 7,279,015 B2 | 10/2007 | Merker |
| 7,312,979 B2 | 12/2007 | Ishizuka et al. |
| 7,341,705 B2 | 3/2008 | Schnitter |
| 7,341,801 B2 | 3/2008 | Reuter et al. |
| 7,358,326 B2 | 4/2008 | Heuer et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,449,588 B2 | 11/2008 | Jonas et al. |
| 7,515,396 B2 | 4/2009 | Biler |
| 7,554,793 B2 | 6/2009 | Chacko |
| 7,563,290 B2 | 7/2009 | Qiu et al. |
| 7,582,958 B2 | 9/2009 | Brailey |
| 7,585,983 B2 | 9/2009 | Reuter et al. |
| 7,604,832 B2 | 10/2009 | Ito et al. |
| 7,688,571 B2 | 3/2010 | Ishizuka et al. |
| 7,697,265 B2 | 4/2010 | Umemoto et al. |
| 7,750,099 B2 | 7/2010 | Chikusa et al. |
| 7,760,490 B2 | 7/2010 | Takatani et al. |
| 7,785,793 B2 | 8/2010 | Li et al. |
| 7,883,796 B2 | 2/2011 | Kida et al. |
| 7,948,069 B2 | 5/2011 | Zhuang |
| 7,972,534 B2 | 7/2011 | Merker et al. |
| 7,973,180 B2 | 7/2011 | Morita et al. |
| 7,974,077 B2 | 7/2011 | Matsuoka et al. |
| 7,994,345 B2 | 8/2011 | Brassat et al. |
| 8,058,135 B2 | 11/2011 | Merker et al. |
| 8,075,640 B2 | 12/2011 | Marek et al. |
| 8,094,434 B2 | 1/2012 | Rawal et al. |
| 8,194,395 B2 | 6/2012 | Zednicek et al. |
| 8,279,584 B2 | 10/2012 | Zednickova |
| 8,293,848 B2 | 10/2012 | Plantenberg et al. |
| 8,300,387 B1 | 10/2012 | Zednickova et al. |
| 8,310,815 B2 | 11/2012 | Freeman et al. |
| 8,313,538 B2 | 11/2012 | Merker et al. |
| 8,379,372 B2 | 2/2013 | Zednicek et al. |
| 8,576,544 B2 | 11/2013 | Rawal et al. |
| 8,824,122 B2 | 9/2014 | Vilc et al. |
| 8,947,857 B2 | 2/2015 | Biler et al. |
| 2003/0105207 A1 | 6/2003 | Kleyer et al. |
| 2005/0065352 A1 | 3/2005 | Brassat et al. |
| 2006/0260713 A1 | 11/2006 | Pyszczek et al. |
| 2007/0035912 A1* | 2/2007 | Hahn ............... H01G 9/012 361/528 |
| 2007/0127190 A1* | 6/2007 | Take ............... H01G 2/08 361/517 |
| 2007/0141745 A1* | 6/2007 | Naito ............... H01G 9/0036 438/99 |
| 2008/0010797 A1* | 1/2008 | Qiu ............... H01G 9/0036 29/25.03 |
| 2009/0310285 A1 | 12/2009 | Reuter et al. |
| 2010/0020470 A1* | 1/2010 | Edmunds ............... H01G 4/38 361/329 |
| 2010/0079930 A1* | 4/2010 | Hayashi ............... H01G 9/012 361/534 |
| 2010/0148124 A1 | 6/2010 | Reuter et al. |
| 2011/0085285 A1* | 4/2011 | Zednicek ............... H01G 9/10 361/523 |
| 2011/0152959 A1* | 6/2011 | Sherwood ............... H01G 9/008 607/5 |
| 2012/0106031 A1 | 5/2012 | Vilc et al. |
| 2012/0113567 A1 | 5/2012 | Rawal et al. |
| 2012/0236470 A1* | 9/2012 | Ishida ............... H01G 9/008 361/531 |
| 2012/0257325 A1 | 10/2012 | Zednickova |
| 2012/0257392 A1 | 10/2012 | Biler et al. |
| 2012/0307420 A1 | 12/2012 | Zednicek et al. |
| 2013/0271894 A1 | 10/2013 | Biler |
| 2015/0043261 A1* | 2/2015 | Koshi ............... H02M 7/003 363/131 |

FOREIGN PATENT DOCUMENTS

| | | |
|---|---|---|
| JP | 3127813 | 5/1991 |
| JP | 05275290 A * | 10/1993 |
| JP | 11112157 | 4/1999 |
| JP | 2005217129 | 8/2005 |
| JP | 2006278875 | 10/2006 |
| JP | WO 2009081663 A1 * | 7/2009 ............... H01G 4/35 |
| JP | 2010226139 A * | 10/2010 |
| WO | WO 2009030615 | 3/2009 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010/089111 | 8/2010 |
| WO | WO 2010102751 | 9/2010 |

OTHER PUBLICATIONS

Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.
Abstract of Japanese Patent—JPH0523528, Feb. 2, 1993, 1 page.

(56) References Cited

OTHER PUBLICATIONS

Machine Translation of JP2005217129.
Machine Translation of JP2006278875.
Machine Translation of JP2005039168.
Material Safety Data Sheet from Dow Corning Corporation on 736 Heat Resistant/Sealant, Mar. 2, 2011, 8 pages.
Paper—Freeman et al., "Electrical Characterization of Polymer Tantalum Capacitors with Poly(3,4-Ethylenedioxythiophene) Cathode," Journal of the Electrochemical Society, vol. 156, No. 6, 2009, 10 pages.
Paper—Merker et al., "Conducting Polymer Dispersions for High-Capacitance Tantalum Capacitors,": CARTS Europe 2006, Sep. 2006, Bad Homburg, Germany, 6 pages.
Paper—Marker et al., "New Conducting Polymer Dispersions for Solid Electrolytic Capacitors," CARTS Europe 2005, Oct. 17-25, 2005, Prague, CZ Republic, 6 pages.
Paper—Marker et al., "Tuning Conducting Polymer Dispersions for High-CV Tantalum Capacitors," CARTS Europe Oct. 29-Nov. 1, 2007, Barcelona, Spain, 6 pages.
Paper—Simpson et al., "Advances and Applications of Inherently Conductive Polymer Technologies Based on Poly(3,4-Ethylenedioxythiophene)," 2005 AIMCAL Fall Technical Conference and 19$^{th}$ International Vacuum Web Coating Conference, Oct. 16-20, 2005, Session 5: Advances in Technology, Myrtle Beach, SC, 10 pages.
Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Presentation—Freeman et al., "Hermetically Sealed Polymer Tantalum Capacitors," CMSE Europe 2010.
Product Information on Dow Corning® 736 Heat Resistant Sealant, 3 pages.
Product Information on Stycase™ 2651, General Purpose, Epoxy Encapsulant, from Emerson & Cuming, Jan. 22, 2007, 3 pages.
Related U.S. Patent Application Form.

\* cited by examiner ific aspects of capacitor design have been a
LOW PROFILE MULTI-ANODE ASSEMBLY IN CYLINDRICAL HOUSING

BACKGROUND OF THE INVENTION

Many specific aspects of capacitor design have been a focus for improving the performance characteristics of capacitors used in electronic circuits in extreme environments such as automobile applications including, for example, antilock braking systems, engine systems, airbags, cabin entertainment systems, etc. Solid electrolytic capacitors (e.g., tantalum capacitors) have been a major contributor to the miniaturization of electronic circuits and have made possible the application of such circuits in extreme environments. Conventional solid electrolytic capacitors may be formed by pressing a metal powder (e.g., tantalum) around a metal lead wire, sintering the pressed part, anodizing the sintered anode, and thereafter applying a solid electrolyte to form a capacitor element. In automotive applications, a capacitor assembly may need to have a high capacitance (e.g., about 100 microFarads to about 500 microFarads), operate at high voltages (e.g., about 50 volts to about 150 volts), and sustain exposure to high temperatures (e.g., about 100° C. to about 150° C.) and high ripple currents (e.g., about 10 Amps to about 100 Amps) without failing. Because exposure of the capacitor assembly to a high ripple current can lead to high temperatures within the capacitor assembly, the capacitor assembly can be damaged and its reliability reduced if it is not able to adequately dissipate heat. This problem is compounded when multiple capacitor elements are utilized in order to form a capacitor assembly with a high enough capacitance. As such, attempts have been made to lower the equivalent series resistance (ESR) of capacitor assemblies that include multiple capacitor elements, as a reduced ESR corresponds with the ability of the capacitor assembly to dissipate heat that is produced when the capacitor assembly is exposed to high ripple currents.

Nevertheless, a need currently exists for a capacitor assembly having improved ESR and heat dissipation capabilities when exposed to high ripple current environments and that can also operate reliably at high temperatures and voltages, particularly when the capacitor assembly includes multiple capacitor elements.

SUMMARY OF THE INVENTION

In accordance with one embodiment of the present invention, a capacitor assembly is disclosed. The capacitor assembly includes a plurality of capacitor elements that each contain a sintered porous anode body, a dielectric layer that overlies the anode body, and a solid electrolyte overlying the dielectric layer. Further, an anode lead extends from each capacitor element. In addition, the capacitor assembly includes a metal cylindrical housing comprising a lid and a base, wherein the lid has a diameter in a −x direction and a height in a −z direction, wherein the ratio of the diameter to the height ranges from about 1.5 to about 20. Moreover, the metal cylindrical housing is hermetically sealed and defines an interior cavity within which the plurality of capacitor elements are arranged about a central axis running along the −z direction.

Other features and aspects of the present invention are set forth in greater detail below.

BRIEF DESCRIPTION OF THE DRAWING

A full and enabling disclosure of the present invention, including the best mode thereof, directed to one of ordinary skill in the art, is set forth more particularly in the remainder of the specification, which makes reference to the appended figure in which.

Figure 1:
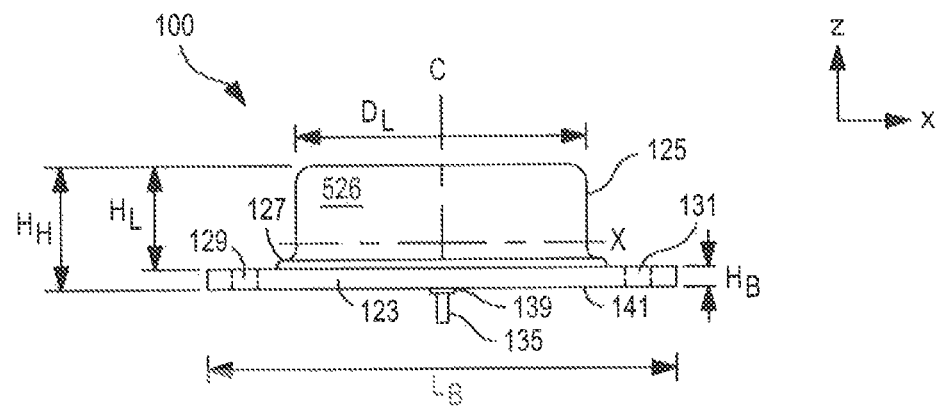
FIG. 1 is a side view of one embodiment of the capacitor assembly of the present invention.

Repeat use of references characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed to a low profile capacitor assembly including a cylindrical housing within which are contained a plurality of capacitor elements for use under extreme conditions, where the capacitor assembly may need to withstand ripple currents as high as 100 Amps, may experience temperatures of 100° C. or more, and may be used in high voltage environments, such as at rated voltages of about 50 volts or more. The capacitor assembly is low profile in that the ratio of the diameter of the lid of the metal cylindrical housing in the −x direction to the height of the metal cylindrical housing in the −z direction ranges from about 1.5 to about 20, yet the capacitor assembly is still efficient at dissipating heat. To help achieve good performance under the aforementioned conditions, a variety of aspects of the capacitor assembly are controlled in the present invention, including the number of capacitor elements, the manner in which the capacitor elements are arranged and incorporated into the assembly, and the manner in which the capacitor elements are formed. For example, to help reduce the ESR of the assembly and to help improve the heat dissipation capabilities of the assembly while increasing overall capacitance, a plurality of capacitor elements are arranged about a central axis running along the −z axis within a metal cylindrical housing. Besides being electrically connected and arranged within the housing in a certain manner, the capacitor elements are also enclosed and hermetically sealed within the metal cylindrical housing, which can limit the amount of oxygen and moisture supplied to the solid electrolyte of the capacitor element. Limiting the amount of oxygen and moisture supplied to the solid electrolyte can help further reduce the ESR of the capacitor assembly, resulting in increased heat dissipation capabilities.

Various embodiments of the present invention will now be described in more detail.

I. Capacitor Elements

A. Anode

The anode of each of the capacitor elements is generally formed from a valve metal powder. The powder may have a specific charge of from about 2,000 microFarads*Volts per gram ("$\mu F*V/g$") to about 500,000 $\mu F*V/g$. As is known in the art, the specific charge may be determined by multiplying capacitance by the anodizing voltage employed, and then dividing this product by the weight of the electrode body prior to anodization. In certain embodiments, the powder may have a high specific charge, such as about 70,000 $\mu F*V/g$ or more, in some embodiments about 80,000 $\mu F*V/g$ or more, in some embodiments about 90,000 $\mu F*V/g$ or more, in some embodiments from about 100,000 to about 400,000 $\mu F*V/g$, and in some embodiments, from about 150,000 to about 350,000 $\mu F*V/g$. Of course, the powder may also have a low specific charge, such as about 70,000 $\mu F*V/g$ or less, in some embodiments about 60,000 $\mu F*V/g$ or less, in some embodiments about 50,000 $\mu F*V/g$ or less; in some embodiments from about 2,000 to about 40,000 $\mu F*V/g$, and in some embodiments, from about 5,000 to about 35,000 $\mu F*V/g$.

The powder may contain individual particles and/or agglomerates of such particles. Compounds for forming the powder include a valve metal (i.e., metal that is capable of oxidation) or valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of 1:1.0±1.0, in some embodiments 1:1.0±0.3, in some embodiments 1:1.0±0.1, and in some embodiments, 1:1.0±0.05. For example, the niobium oxide may be $NbO_{0.7}$, $NbO_{1.0}$, $NbO_{1.1}$, and $NbO_2$. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al; U.S. Pat. No. 6,592,740 to Fife, et al.; and U.S. Pat. No. 6,639,787 to Kimmel et al.; and U.S. Pat. No. 7,220,397 to Kimmel, al., as well as U.S. Patent Application Publication Nos. 2005/0019581 to Schnitter; 2005/0103638 to Schnitter, et al.; 2005/0013765 to Thomas, et al.

The powder may be formed using techniques known to those skilled in the art. A precursor tantalum powder, for instance, may be formed by reducing a tantalum salt (e.g., potassium fluotantalate ($K_2TaF_7$), sodium fluotantalate ($Na_2TaF_7$), tantalum pentachloride ($TaCl_5$), etc.) with a reducing agent (e.g., hydrogen, sodium, potassium, magnesium, calcium, etc.). Such powders may be agglomerated in a variety of ways, such as through one or multiple heat treatment steps at a temperature of from about 700° C. to about 1400° C., in some embodiments from about 750° C. to about 1200° C., and in some embodiments, from about 800° C. to about 1100° C. Heat treatment may occur in an inert or reducing atmosphere. For example, heat treatment may occur in an atmosphere containing hydrogen or a hydrogen-releasing compound (e.g., ammonium chloride, calcium hydride, magnesium hydride, etc.) to partially sinter the powder and decrease the content of impurities (e.g., fluorine). If desired, agglomeration may also be performed in the presence of a getter material, such as magnesium. After thermal treatment, the highly reactive coarse agglomerates may be passivated by gradual admission of air. Other suitable agglomeration techniques are also described in U.S. Pat. No. 6,576,038 to Rao; U.S. Pat. No. 6,238,456 to Wolf, et al.; U.S. Pat. No. 5,954,856 to Pathare, et al.; U.S. Pat. No. 5,082,491 to Rerat; U.S. Pat. No. 4,555,268 to Getz; U.S. Pat. No. 4,483,819 to Albrecht, et al.; U.S. Pat. No. 4,441,927 to Getz, et al.; and U.S. Pat. No. 4,017,302 to Bates, et al.

To facilitate the construction of the anode body, certain components may also be included in the powder. For example, the powder may be optionally mixed with a binder and/or lubricant to ensure that the particles adequately adhere to each other when pressed to form the anode body. Suitable binders may include, for instance, poly(vinyl butyral); poly(vinyl acetate); poly(vinyl alcohol); poly(vinyl pyrollidone); cellulosic polymers, such as carboxymethyl-cellulose, methyl cellulose, ethyl cellulose, hydroxyethyl cellulose, and methylhydroxyethyl cellulose; atactic polypropylene, polyethylene; polyethylene glycol (e.g., Carbowax from Dow Chemical Co.); polystyrene, poly(butadiene/styrene); polyamides, polyimides, and polyacrylamides, high molecular weight polyethers; copolymers of ethylene oxide and propylene oxide; fluoropolymers, such as polytetrafluoroethylene, polyvinylidene fluoride, and fluoro-olefin copolymers; acrylic polymers, such as sodium polyacrylate, poly(lower alkyl acrylates), poly(lower alkyl methacrylates) and copolymers of lower alkyl acrylates and methacrylates; and fatty acids and waxes, such as stearic and other soapy fatty acids, vegetable wax, microwaxes (purified paraffins), etc. The binder may be dissolved and dispersed in a solvent. Exemplary solvents may include water, alcohols, and so forth. When utilized, the percentage of binders and/or lubricants may vary from about 0.1% to about 8% by weight of the total mass. It should be understood, however, that binders and/or lubricants are not necessarily required in the present invention.

The resulting powder may be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing. The powder may be compacted around an anode lead (e.g., tantalum wire). It should be further appreciated that the anode lead may alternatively be attached (e.g., welded) to the anode body subsequent to pressing and/or sintering of the anode body.

After compaction, any binder/lubricant may be removed by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al.

Thereafter, the pellet is sintered to form a porous, integral mass. For example, in one embodiment, the pellet may be sintered at a temperature of from about 1200° C. to about 2000° C., and in some embodiments, from about 1500° C. to about 1800° C. under vacuum or an inert atmosphere. Upon sintering, the pellet shrinks due to the growth of bonds between the particles. The pressed density of the pellet after sintering may vary, but is typically from about 2.0 to about 7.0 grams per cubic centimeter, in some embodiments from about 2.5 to about 6.5, and in some embodiments, from about 3.0 to about 6.0 grams per cubic centimeter. The pressed density is determined by dividing the amount of material by the volume of the pressed pellet.

Although not required, the thickness of the anode body may be selected to improve the electrical performance of the capacitor. For example, the thickness of the anode may be about 4 millimeters or less, in some embodiments, from about 0.05 to about 2 millimeters, and in some embodiments, from about 0.1 to about 1 millimeter. The shape of the anode may also be selected to improve the electrical properties of the resulting capacitor. For example, the anode may have a shape that is curved, sinusoidal, rectangular, U-shaped, V-shaped, etc. The anode may also have a "fluted" shape in that it contains one or more furrows, grooves, depressions, or indentations to increase the surface to volume ratio to minimize ESR and extend the frequency response of the capacitance. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al.

An anode lead may also be connected to the anode body that extends in a longitudinal direction therefrom. The anode lead may be in the form of a wire, sheet, etc., and may be formed from a valve metal compound, such as tantalum, niobium, niobium oxide, etc. Connection of the lead may be accomplished using known techniques, such as by welding the lead to the body or embedding it within the anode body during formation (e.g., prior to compaction and/or sintering).

B. Dielectric

A dielectric also overlies or coats the anode body of each of the capacitor elements in the capacitor assembly. The dielectric may be formed by anodically oxidizing ("anodizing") the sintered anode so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping the anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode body. Of course, other known methods may also be employed, such as pulse or step potentiostatic methods. The voltage at which anodic oxidation occurs typically ranges from about 4 to about 400 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode body and within its pores.

C. Solid Electrolyte

As indicated above, a solid electrolyte overlies the dielectric that generally functions as the cathode for the capacitor. In some embodiments, the solid electrolyte may include a manganese dioxide. If the solid electrolyte includes manganese dioxide, the manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

In other embodiments, the solid electrolyte contains a conductive polymer, which is typically π-conjugated and has electrical conductivity after oxidation or reduction, such as an electrical conductivity of at least about 1 μS/cm. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. In one embodiment, for example, the polymer is a substituted polythiophene, such as those having the following general structure:

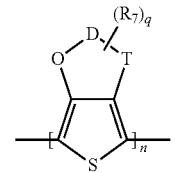

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "R₇" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

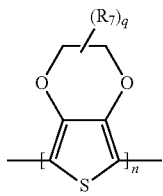

Methods for forming conductive polymers, such as described above, are well known in the art. For instance, U.S. Pat. No. 6,987,663 to Merker, et al., describes various techniques for forming substituted polythiophenes from a monomeric precursor. The monomeric precursor may, for instance, have the following structure:

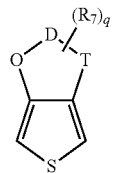

wherein,

T, D, R₇, and q are defined above. Particularly suitable thiophene monomers are those in which "D" is an optionally substituted $C_2$ to $C_3$ alkylene radical. For instance, optionally substituted 3,4-alkylenedioxythiophenes may be employed that have the general structure:

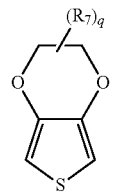

wherein, R₇ and q are as defined above. In one particular embodiment, "q" is 0. One commercially suitable example of 3,4-ethylenedioxthiophene is available from Heraeus Clevios under the designation Clevios™ M. Other suitable monomers are also described in U.S. Pat. No. 5,111,327 to Blohm, et al., and U.S. Pat. No. 6,635,729 to Groenendaal, et al. Derivatives of these monomers may also be employed that are, for example, dimers or trimers of the above monomers. Higher molecular derivatives, i.e., tetramers, pentamers, etc. of the monomers are suitable for use in the present invention. The derivatives may be made up of identical or different monomer units and used in pure form and in a mixture with one another and/or with the monomers. Oxidized or reduced forms of these precursors may also be employed.

Various methods may be utilized to form the conductive polymer layer. For example, an in situ polymerized layer may be formed by chemically polymerizing monomers in the presence of an oxidative catalyst. The oxidative catalyst typically includes a transition metal cation, such as iron(III), copper(II), chromium(VI), cerium(IV), manganese(IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., $FeCl_3$) or iron(III) salts of other inorganic acids, such as $Fe(ClO_4)_3$ or $Fe_2(SO_4)_3$ and the iron(III) salts of organic acids and inorganic acids comprising organic radicals. Examples of iron (III) salts of inorganic acids with organic radicals include, for instance, iron(III) salts of sulfuric acid monoesters of $C_1$ to $C_{20}$ alkanols (e.g., iron(III) salt of lauryl sulfate). Likewise, examples of iron(III) salts of organic acids include, for instance, iron(III) salts of $C_1$ to $C_{20}$ alkane sulfonic acids (e.g., methane, ethane, propane, butane, or dodecane sulfonic acid); iron (III) salts of aliphatic perfluorosulfonic acids (e.g., trifluoromethane sulfonic acid, perfluorobutane sulfonic acid, or perfluorooctane sulfonic acid); iron (III) salts of aliphatic $C_1$ to $C_{20}$ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by $C_1$ to $C_{20}$ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

The oxidative catalyst and monomer may be applied either sequentially or together to initiate the polymerization reaction. Suitable application techniques for applying these components include screen-printing, dipping, electrophoretic coating, and spraying. As an example, the monomer may initially be mixed with the oxidative catalyst to form a precursor solution. Once the mixture is formed, it may be applied to the anode part and then allowed to polymerize so that a conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer. Regardless, polymerization is typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al.

In addition to in situ application, the conductive polymer solid electrolyte may also be applied in the form of a dispersion of conductive polymer particles. One benefit of employing a dispersion is that it may minimize the presence of ionic species (e.g., $Fe^{2+}$ or $Fe^{3+}$) produced during in situ polymerization, which can cause dielectric breakdown under high electric field due to ionic migration. Thus, by applying the conductive polymer as a dispersion rather through in situ polymerization, the resulting capacitor may exhibit a relatively high "breakdown voltage." To enable good impregnation of the anode, the particles employed in the dispersion typically have a small size, such as an average size (e.g., diameter) of from about 1 to about 150 nanometers, in some embodiments from about 2 to about 50 nanometers, and in some embodiments, from about 5 to about 40 nanometers. The diameter of the particles may be determined using known techniques, such as by ultracentrifuge, laser diffraction, etc. The shape of the particles may likewise vary. In one particular embodiment, for instance, the particles are spherical in shape. However, it should be understood that other shapes are also contemplated by the present invention, such as plates, rods, discs, bars, tubes, irregular shapes, etc. The concentration of the particles in the dispersion may vary depending on the desired viscosity of the dispersion and the particular manner in which the dispersion is to be applied to the capacitor. Typically, however, the particles constitute from about 0.1 to about 10 wt. %, in some embodiments from about 0.4 to about 5 wt. %, and in some embodiments, from about 0.5 to about 4 wt. % of the dispersion.

The dispersion also generally contains a counterion that enhances the stability of the particles. That is, the conductive polymer (e.g., polythiophene or derivative thereof) typically has a charge on the main polymer chain that is neutral or positive (cationic). Polythiophene derivatives, for instance, typically carry a positive charge in the main polymer chain. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion that counteracts the charge of the conductive polymer. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to conductive polymers in the dispersion and in the resulting layer is typically from about 0.5:1 to about 50:1, in some embodiments from about 1:1 to about 30:1, and in some embodiments, from about 2:1 to about 20:1. The weight of the electrically conductive polymers corresponds referred to the above-referenced weight ratios refers to the weighed-in portion of the monomers used, assuming that a complete conversion occurs during polymerization. In addition to conductive polymer(s) and counterion(s), the dispersion may also contain one or more binders, dispersion agents, fillers, adhesives, crosslinking agents, etc.

The polymeric dispersion may be applied using a variety of known techniques, such as by spin coating, impregnation, pouring, dropwise application, injection, spraying, doctor blading, brushing, printing (e.g., ink-jet, screen, or pad printing), or dipping. Although it may vary depending on the application technique employed, the viscosity of the dispersion is typically from about 0.1 to about 100,000 mPas (measured at a shear rate of 100 $s^{-1}$), in some embodiments from about 1 to about 10,000 mPas, in some embodiments from about 10 to about 1,500 mPas, and in some embodiments, from about 100 to about 1000 mPas. Once applied, the layer may be dried and/or washed. One or more additional layers may also be formed in this manner to achieve the desired thickness. Typically, the total thickness of the layer(s) formed by this particle dispersion is from about 1 to about 50 μm, and in some embodiments, from about 5 to about 20 μm. The weight ratio of counterions to conductive polymers is likewise from about 0.5:1 to about 50:1, in some embodiments from about 1:1 to about 30:1, and in some embodiments, from about 2:1 to about 20:1.

If desired, a hydroxyl-functional nonionic polymer may also be included in the solid electrolyte. The term "hydroxy-functional" generally means that the compound contains at least one hydroxyl functional group or is capable of possessing such a functional group in the presence of a solvent. Without intending to be limited by theory, it is believed that hydroxy-functional nonionic polymers can improve the degree of contact between the conductive polymer and the surface of the internal dielectric, which is typically relatively smooth in nature as a result of higher forming voltages. This unexpectedly increases the breakdown voltage and wet-to-dry capacitance of the resulting capacitor. Furthermore, it is believed that the use of a hydroxy-functional polymer with a certain molecular weight can also minimize the likelihood of chemical decomposition at high voltages. For instance, the molecular weight of the hydroxy-functional polymer may be from about 100 to 10,000 grams per mole, in some embodiments from about 200 to 2,000, in some embodiments from about 300 to about 1,200, and in some embodiments, from about 400 to about 800.

Any of a variety of hydroxy-functional nonionic polymers may generally be employed for this purpose. In one embodiment, for example, the hydroxy-functional polymer is a polyalkylene ether. Polyalkylene ethers may include polyalkylene glycols (e.g., polyethylene glycols, polypropylene glycols polytetramethylene glycols, polyepichlorohydrins, etc.), polyoxetanes, polyphenylene ethers, polyether ketones, and so forth. Polyalkylene ethers are typically predominantly linear, nonionic polymers with terminal hydroxy groups. Particularly suitable are polyethylene glycols, polypropylene glycols and polytetramethylene glycols (polytetrahydrofurans), which are produced by polyaddition of ethylene oxide, propylene oxide or tetrahydrofuran onto water. The polyalkylene ethers may be prepared by polycondensation reactions from diols or polyols. The dial component may be selected, in particular, from saturated or unsaturated, branched or unbranched, aliphatic dihydroxy compounds containing 5 to 36 carbon atoms or aromatic dihydroxy compounds, such as, for example, pentane-1,5-dial, hexane-1,6-diol, neopentyl glycol, bis-(hydroxymethyl)-cyclohexanes, bisphenol A, dimer dials, hydrogenated dimer dials or even mixtures of the dials mentioned. In addition, polyhydric alcohols may also be used in the polymerization reaction, including for example glycerol, di- and polyglycerol, trimethylolpropane, pentaerythritol or sorbitol.

In addition to those noted above, other hydroxy-functional nonionic polymers may also be employed in the present invention. Some examples of such polymers include, for instance, ethoxylated alkylphenols; ethoxylated or propoxylated $C_6$-$C_{24}$ fatty alcohols; polyoxyethylene glycol alkyl ethers having the general formula: $CH_3$—$(CH_2)_{10-16}$—$(O$—$C_2H_4)_{1-25}$—$OH$ (e.g., octaethylene glycol monododecyl ether and pentaethylene glycol monododecyl ether); polyoxypropylene glycol alkyl ethers having the general formula: $CH_3$—$(CH_2)_{10-16}$—$(O$—$C_3H_6)_{1-25}$—$OH$; polyoxyethylene glycol octylphenol ethers having the following general formula: $C_8H_{17}$—$(C_6H_4)$—$(O$—$C_2H_4)_{1-25}$—$OH$ (e.g., Triton™ X-100); polyoxyethylene glycol alkylphenol ethers having the following general formula: $C_9H_{19}$—$(C_6H_4)$—$(O$—$C_2H_4)_{1-25}$—$OH$ (e.g., nonoxynol-9); polyoxyethylene glycol esters of $C_8$-$C_{24}$ fatty acids, such as polyoxyethylene glycol sorbitan alkyl esters (e.g., polyoxyethylene (20) sorbitan monolaurate, polyoxyethylene (20) sorbitan monopalmitate, polyoxyethylene (20) sorbitan monostearate, polyoxyethylene (20) sorbitan monooleate, PEG-20 methyl glucose distearate, PEG-20 methyl glucose sesquistearate, PEG-80 castor oil, and PEG-20 castor oil, PEG-3 castor oil, PEG 600 dioleate, and PEG 400 dioleate) and polyoxyethylene glycerol alkyl esters (e.g., polyoxyethylene-23 glycerol laurate and polyoxyethylene-20 glycerol stearate); polyoxyethylene glycol ethers of $C_8$-$C_{24}$ fatty acids (e.g., polyoxyethylene-10 cetyl ether, polyoxyethylene-10 stearyl ether, polyoxyethylene-20 cetyl ether, polyoxyethylene-10 oleyl ether, polyoxyethylene-20 oleyl ether, polyoxyethylene-20 isohexadecyl ether, polyoxyethylene-15 tridecyl ether, and polyoxyethylene-6 tridecyl ether); block copolymers of polyethylene glycol and polypropylene glycol (e.g., Poloxamers); and so forth, as well as mixtures thereof.

The hydroxy-functional nonionic polymer may be incorporated into the solid electrolyte in a variety of different ways. In certain embodiments, for instance, the nonionic polymer may simply be incorporated into any conductive polymer layer(s) formed by a method as described above (e.g., in situ polymerization or pre-polymerized particle dispersion). In other embodiments, however, the nonionic polymer may be applied after the initial polymer layer(s) are formed.

D. External Polymer Coating

Although not required, an external polymer coating may be applied to the anode body and overlie the solid electrolyte of each of the capacitor elements in the capacitor assembly. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc.

E. Other Components of the Capacitor Elements

If desired, the capacitor elements may also contain other layers as is known in the art. For example, a protective coating may optionally be formed between the dielectric and solid electrolyte, such as one made of a relatively insulative resinous material (natural or synthetic), such as shellac resins. These and other protective coating materials are described in more detail U.S. Pat. No. 6,674,635 to Fife, et al. If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

Figure 3:
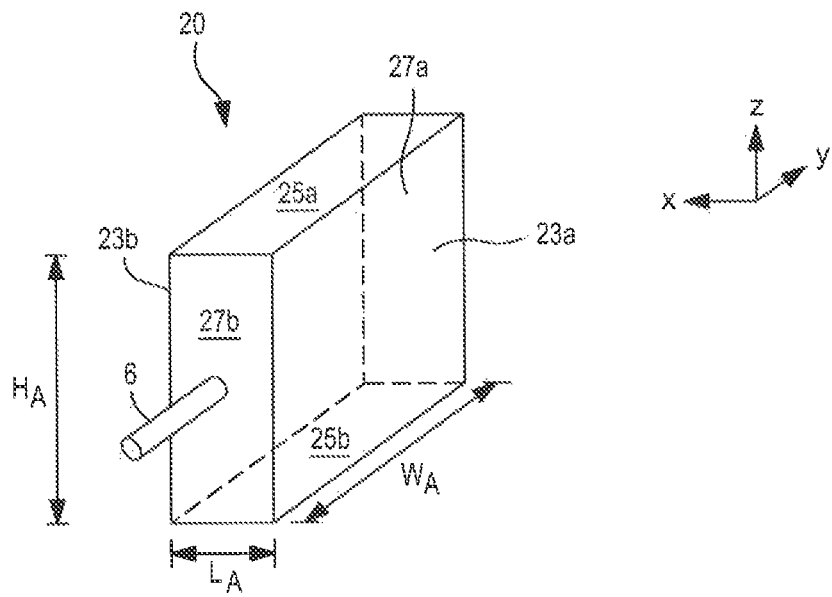
FIG. 3 is a perspective view of one of the plurality of capacitor elements that can be used in the capacitor assembly of the present invention.

Regardless of the various components used to form each of the plurality of capacitor elements, as shown in FIG. 3, each capacitor element 20 can have a length $L_A$ in the −x direction ranging from about 0.5 millimeter to about 5 millimeters, such as from about 1.25 millimeters to about 4 millimeters, such as from about 1.5 millimeters to about 3 millimeters, a width $W_A$ in the −y direction ranging from about 2 millimeters to about 10 millimeters, such as from about 2.5 millimeters to about 8 millimeters, such as from about 3 millimeters to about 6 millimeters, and a height $H_A$ in the −z direction ranging from about 2 millimeters to about 10 millimeters, such as from about 2.5 millimeters to about 8 millimeters, such as from about 3 millimeters to about 6 millimeters. Further, each capacitor element 20 can include opposing major surfaces 23a and 23b, first opposing minor surfaces 25a and 25b, and second opposing minor surfaces 27a and 27b. The term major surface is intended to mean a surface of the capacitor element 20 having a larger surface area than the other surfaces (i.e., minor surfaces) of the capacitor element. As shown, the anode lead 6 can extend from one of the second opposing minor surfaces 27b, although it is to be understood that the anode lead 6 can extend from any other surface depending on how the capacitor elements 20 are arranged in the housing.

II. Housing

As indicated above, a plurality of capacitor elements are hermetically sealed within a metal cylindrical housing to form the capacitor assembly of the present invention. The number of capacitor elements hermetically sealed within the metal cylindrical housing can range from 2 to about 50, in some embodiments from 3 to about 25, and in some embodiments, from 4 to about 20. Hermetic sealing can, in some embodiments, occur in the presence of a gaseous atmosphere that contains at least one inert gas so as to inhibit oxidation of the solid electrolyte during use. The inert gas may include, for instance, nitrogen, helium, argon, xenon, neon, krypton, radon, and so forth, as well as mixtures thereof. Typically, inert gases constitute the majority of the atmosphere within the housing, such as from about 50 wt. % to 100 wt. %, in some embodiments from about 75 wt. % to 100 wt. %, and in some embodiments, from about 90 wt. % to about 99 wt. % of the atmosphere. If desired, a relatively small amount of non-inert gases may also be employed, such as carbon dioxide, oxygen, water vapor, etc. In such cases, however, the non-inert gases typically constitute 15 wt. % or less, in some embodiments 10 wt. % or less, in some embodiments about 5 wt. % or less, in some embodiments about 1 wt. % or less, and in some embodiments, from about 0.01 wt. % to about 1 wt. % of the atmosphere within the housing. For example, the moisture content (expressed in terms of relatively humidity) may be about 10% or less, in some embodiments about 5% or less, in some embodiments about 1% or less, and in some embodiments, from about 0.01 to about 5%.

Any of a variety of different metals may be used to form the housing to facilitate the capacitor assembly's ability to efficiently dissipate heat. In one embodiment, for example, the housing includes one or more layers of a metal, such as tantalum, niobium, aluminum, nickel, hafnium, titanium, copper, silver, steel (e.g., stainless), alloys thereof (e.g., electrically conductive oxides), composites thereof (e.g., metal coated with electrically conductive oxide), and so forth.

Regardless of the type of metal from which it is formed, the overall thickness or height of the housing (including a lid and base) is generally selected to minimize the thickness or height of the low profile capacitor assembly. For instance, referring to FIG. 1, the overall height $H_H$ of the housing in the −z direction can range from about 3 millimeters to about 30 millimeters, such as from about 3.5 millimeters to about 20 millimeters, such as from about 4.5 millimeters to about 15 millimeters. Specifically, the base 123 can have a height $H_B$ in the −z direction ranging from about 0.25 millimeters to about 5 millimeters, such as from about 0.5 millimeters to about 4.5 millimeters, such as from about 1 millimeter to about 4 millimeters, while the lid 125 can have a height $H_L$ in the −z direction ranging from about 2.5 millimeters to about 25 millimeters, such as from about 3 millimeters to about 15 millimeters, such as from about 3.5 millimeters to about 10 millimeters. Meanwhile, the diameter $D_L$ of the lid of the cylindrical metal housing in the −x direction may range from about 5 millimeters to about 60 millimeters, such as from about 10 millimeters to 50 millimeters, such as from about 15 millimeters to about 40 millimeters. Further, referring now to FIG. 2, at its longest portion, the length $L_B$ of the base 123 of the cylindrical metal housing in the −y direction may range from about 10 millimeters to about 70 millimeters, such as from about 15 millimeters to about 60 millimeters, such as from about 20 millimeters to about 50 millimeters. In addition, at its widest portion, the width $W_B$ of the base 123 of the cylindrical metal housing in the −y direction may range from about 6 millimeters to about 65 millimeters, such as from about 12 millimeters to about 60 millimeters, such as from about 20 millimeters to about 50 millimeters. Moreover, the housing can have a low profile such that the ratio of the diameter $D_L$ of the housing lid in the −x direction to the overall height $H_H$ of the housing (including the lid and base) in the −z direction is at least about 1.5. For instance, the ratio of diameter $D_L$ to the height $H_H$ can range from about 1.5 to about 20, such as from about 1.6 to about 15, such as from about 1.7 to about 10.

The plurality of capacitor elements may be attached to the housing in various configurations and using any of a variety of different techniques. Although by no means required, the capacitor elements may be attached to the housing in such a manner that anode and cathode terminations are formed external to the housing for subsequent integration into a circuit. The particular configuration of the terminations may depend on the intended application. In one embodiment, for example, the capacitor assembly may be formed so that it is surface mountable, and yet still mechanically robust. For example, the anode leads and the cathodes of the capacitor elements may be electrically connected to external, surface mountable terminations (e.g., pins, pads, sheets, plates, frames, etc.), which may extend through the housing to connect with the capacitor elements, such as through a wire connection, tape connection, conductive trace, etc. In another embodiment, the cathodes of the capacitor elements may be connected to the housing itself, such as via welding, a conductive adhesive, etc., where the housing acts as the cathode termination, while the anode leads of the capacitor elements may be electrically connected to external, surface mountable terminations (e.g., pins, pads, sheets, plates, frames, etc.), which may extend through the housing to connect with the anode leads via a connecting wire.

When utilized, the thickness or height of the external anode and cathode terminations is generally selected to minimize the thickness of the capacitor assembly. For instance, the thickness of the terminations may range from about 0.05 millimeters to about 1 millimeter, such as from about 0.05 millimeters to about 0.5 millimeters, such as from about 0.1 millimeters to about 0.2 millimeters. If desired, the surface of the terminations may be electroplated with nickel, silver, gold, tin, cobalt, etc. or alloys thereof as is known in the art to ensure that the final part is mountable to the circuit board. In one particular embodiment, the termination(s) are deposited with nickel and silver flashes, respectively, and the mounting surface is also plated with a tin solder layer. In another embodiment, the termination(s) are deposited with thin outer metal layers (e.g., gold) onto a base metal layer (e.g., copper alloy) to further increase conductivity.

Figure 2:
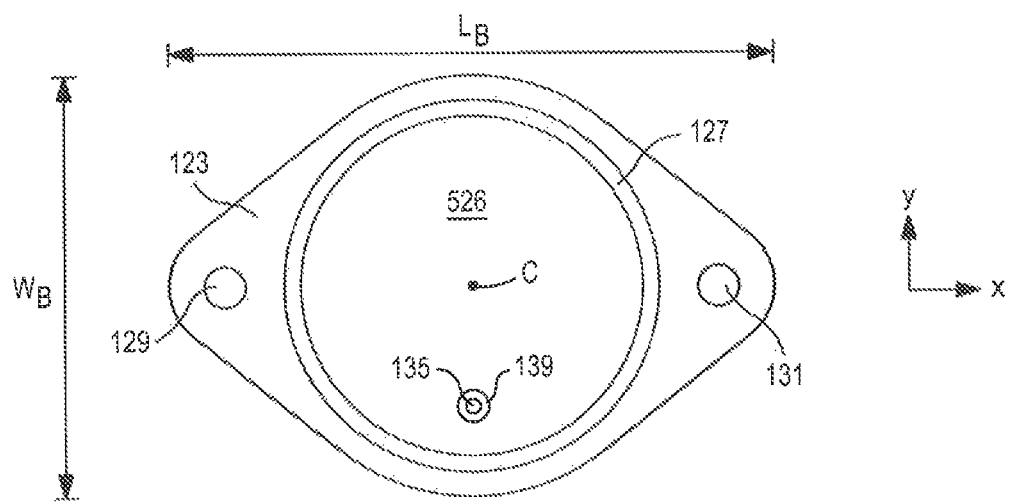
FIG. 2 is a top view of the capacitor assembly of FIG. 1, taken from cut line x, before any capacitor elements have been positioned inside the housing.

Referring to FIGS. 1-6, for example, the various components of one particular embodiment of a capacitor assembly 100 are shown. The capacitor assembly 100 contains 10 capacitor elements disposed inside a housing and arranged about a central axis C that runs along the −z direction. However, it is to be understood that any number of capacitor elements can be utilized. As shown in FIGS. 1-2, the housing of the capacitor assembly 100 includes base 123 and a lid 125 between which a cavity 526 is formed. The base 123 and lid 125 can be formed from one or more layers of a metal. The lid 125 has a cylindrical shape, while the footprint of the base is generally cylindrical, although it is tapered such that it has a diamond, oblong, or elliptical type shape to allow for sufficient room such that mounting holes 129 and 131 can be formed in the tapered portions of the base 123, where such mounting holes 129 and 131 can be used to connect the capacitor assembly 100 to a substrate such as a circuit board. An anode termination 135 which is surrounded by an insulative material 139 can extend through a lower surface 141 of the base 123 to which the anode leads 6 of the capacitor elements 20 can be electrically connected, as discussed in more detail below. Meanwhile, the base 123 can serve as the cathode termination, where the insulative material 139 (e.g., a TEFLON washer) prevents contact between the base 123 and the anode termination 135, although it is to be understood that any suitable anode and cathode terminations known in the art are contemplated by the present invention.

Figure 4:
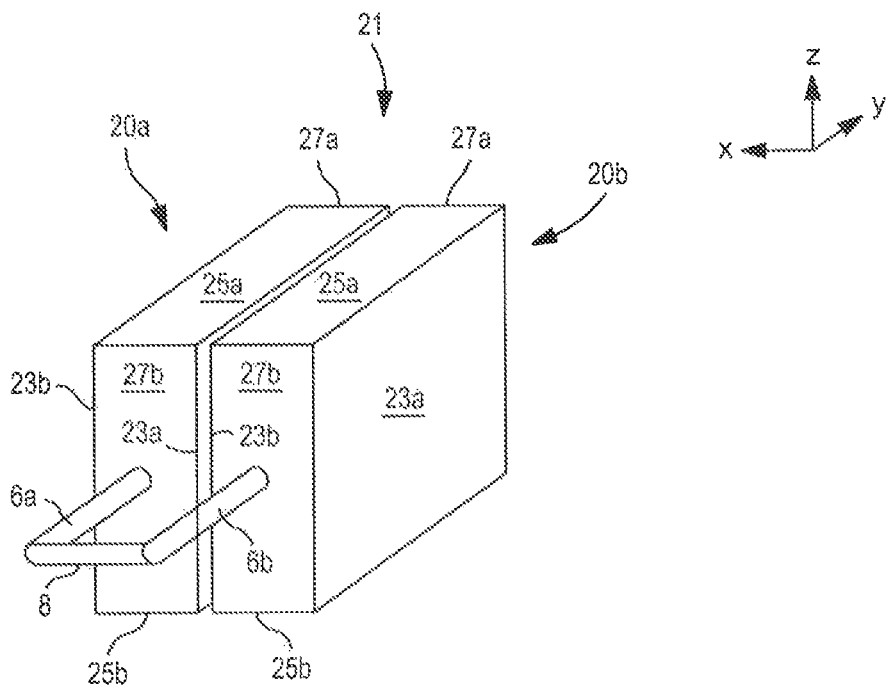
FIG. 4 is a perspective view of a pair of capacitor elements that can be used in the capacitor assembly of the present invention.
Figure 5:
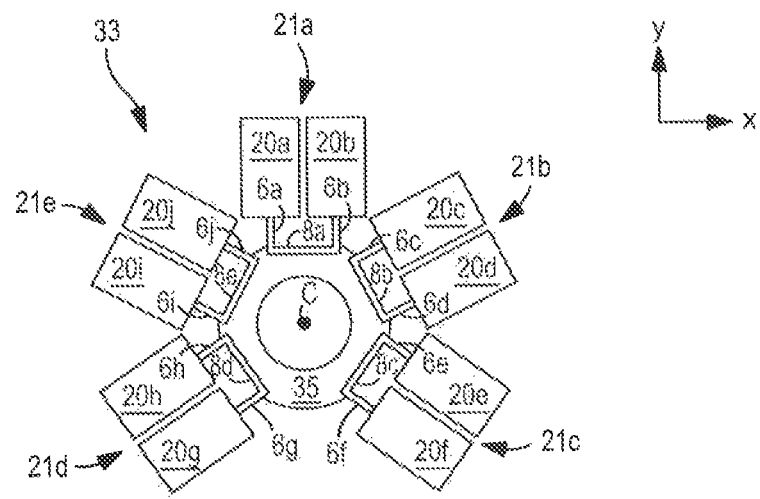
FIG. 5 is a top view of a radial block of multiple pairs of capacitor elements that can be used in the capacitor assembly of the present invention.
Figure 6:
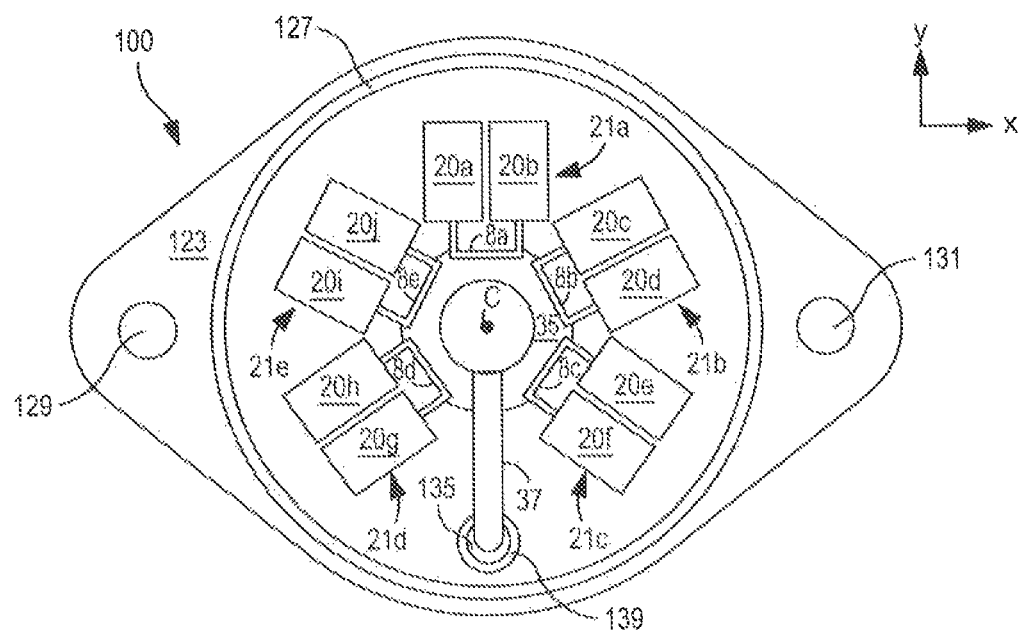
FIG. 6 is a top view of one embodiment of the capacitor assembly of FIG. 1, taken from cut line x, after the capacitor elements have been positioned inside the housing.

Referring now to FIGS. 5-6, the capacitor elements 20 are arranged inside the cavity 526 about a central axis C that runs along the −z direction, where such an arrangement helps to reduce the ESR of the capacitor assembly 100, where the reduced ESR contributes to the ability of the capacitor assembly 100 to dissipate heat effectively. Although not required, the capacitor elements 20 (see FIG. 3) can be arranged in pairs, where each pair 21 of capacitor elements is arranged inside the cavity 526 about the central axis C. As shown in FIG. 4, when two capacitor elements 20a and 20b are arranged in a pair 21, a major surface 23a of the first capacitor element 20a can be positioned adjacent the major surface 23b of the second capacitor element 20b. Further the anode lead 6a from the first capacitor element 20a and the anode lead 6b from the second capacitor element 20b can be joined via a conductive member 8. The conductive member 8 may possess mounting regions (not shown) that are connected to the anode lead 6a and 6b. The regions may have a "U-shape" for further enhancing surface contact and mechanical stability of the leads 6a-6b.

Turning now to FIGS. 5-6, the arrangement of 5 capacitor element pairs 21a-21e (for a total of 10 capacitor elements 21a-21j) into a capacitor element block 33 is shown in more detail. As shown, the pairs 21a-21e are arranged in a radial pattern about the central axis C that runs along the −z direction, where such a pattern and spacing facilitates the ability of the capacitor assembly to dissipate heat. Meanwhile, as shown, the conductive members 8a-8e for each pair of capacitor elements 21a-21e are joined together via a connection 35. In one embodiment, the connection 35 can be formed by soldering the conductive members 8a-8e together, although any other suitable means of connecting anode leads 6a-6j is contemplated by the present invention. Once the capacitor element block 33 is assembled as shown in FIG. 5, the block 33 can be positioned on the metal base 123 of the capacitor assembly 100 as shown FIG. 6. A surface of each capacitor element 20a-20j (e.g., minor surface 25b as shown in FIGS. 3-4) can be joined to the metal base 123 via any suitable means, such as via a welding, a conductive adhesive, etc., where an electrical connection is formed between each capacitor element 20a-20j and the metal base 123, where the base serves as a cathode termination. However, it is also to be understood that a separate external cathode termination can be utilized that is a separate component from the metal base 123. Meanwhile, the connection 35 that joins the conductive members 8a-8e together can be electrically connected to the anode termination 135 via an additional connection 37, such as a conductive member that is a metal wire or tape. In one embodiment, the connection 37 can be a copper tape. The anode termination 135 can extend through a lower surface 141 of the metal base 123 to provide for connection to substrate or circuit board as desired.

As mentioned above, it is to be understood that attachment of the capacitor elements 20a-20j to the base 123 of the housing, may generally be accomplished using any of a variety of known techniques, such as resistance welding, laser welding, conductive adhesives, etc. When employed, conductive adhesives may be formed from conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako, et al.

In the embodiments shown in FIGS. 5-6, the capacitor assembly 100 includes 10 capacitor elements. However, as noted above, any number of capacitor elements may generally be employed in the present invention, such as 2 to about 50, in some embodiments from 3 to about 25, and in some embodiments, from 4 to about 20. Further, although the capacitor elements 20a-20j are shown as being positioned in the housing in pairs 21a-21e having their anode leads joined together with a conductive member, this is not required, as shown in FIGS. 7-9, which will be discussed in more detail below.

Figure 7:
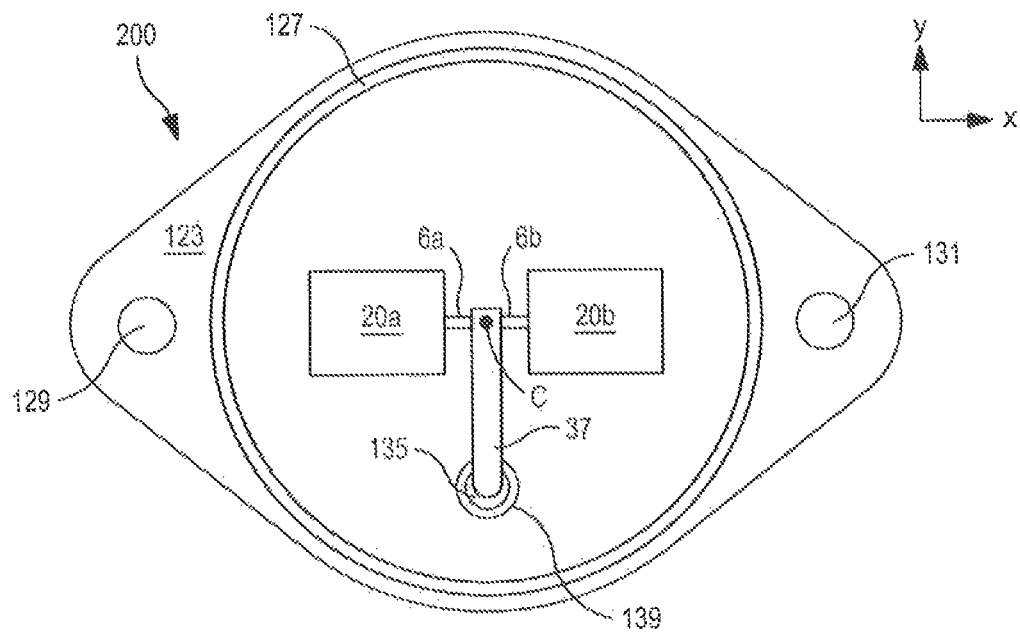
FIG. 7 is a top view of another embodiment of a capacitor assembly of the present invention.

FIG. 7 illustrates another embodiment contemplated by the present invention where the capacitor assembly 200 includes two capacitor elements 20a and 20b arranged about a central axis C, where anode leads 6a and 6b face each other at the central axis C and are joined to the anode termination 135 via a connection 37, which can be any suitable connection such as a conductive member that is a metal wire or tape. In one embodiment, the connection 37 can be a copper tape. Although the anode leads 6a and 6b are shown as being arranged parallel to the −x direction and are generally perpendicular with the connection 37, this is not required, and it is to be understood that the capacitor elements 20a and 20b can be arranged in any position about the central axis C.

Figure 8:
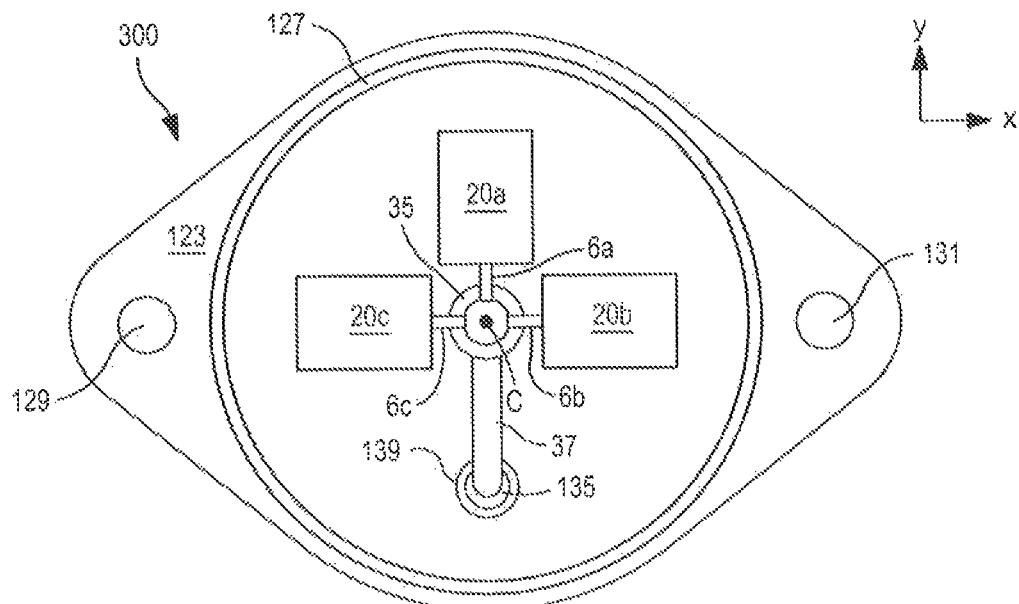
FIG. 8 is a top view of still another embodiment of a capacitor assembly of the present invention.

FIG. 8 illustrates still another embodiment contemplated by the present invention where the capacitor assembly 300 includes three capacitor elements 20a, 20b, and 20c arranged about a central axis C, where anode leads 6a, 6b, and 6c face each other at the central axis C and are joined together via a connection 35 (e.g., solder), where such connection 35 is then joined to the anode termination 135 via a connection 37, which can be any suitable connection such as a conductive member that is a metal wire or tape. In one embodiment, the connection 37 can be a copper tape. Although the anode lead 6a is shown as being arranged in parallel with the −y direction and generally perpendicular to the anode leads 6b and 6c, which are arranged parallel to the −x direction and are generally perpendicular with the connection 37, this is not required, and it is to be understood that the capacitor elements 20a, 20b, and 20c can be arranged in any position about the central axis C.

Figure 9:
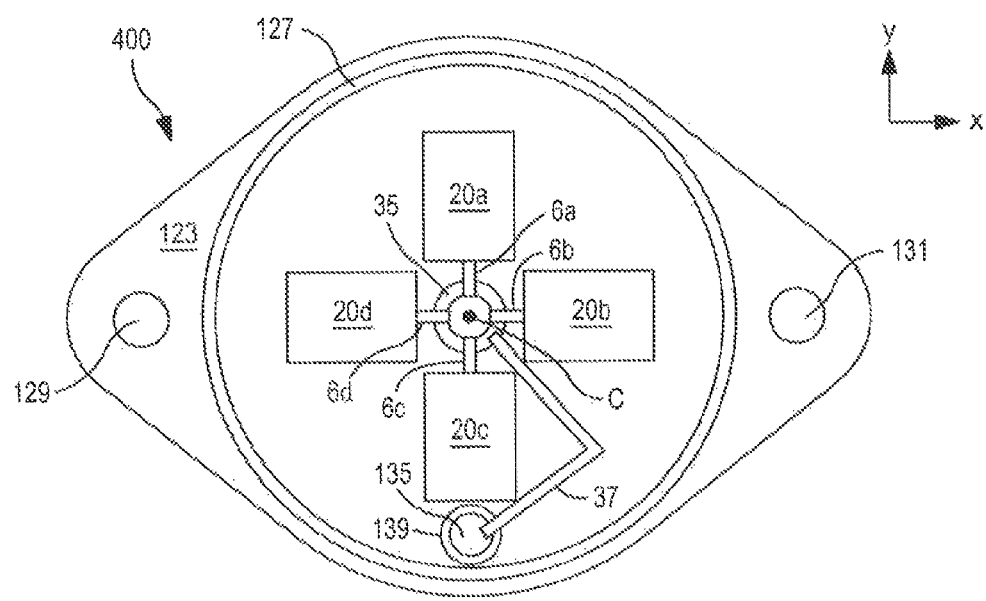
FIG. 9 is a top view of yet another embodiment of a capacitor assembly of the present invention.

FIG. 9 illustrates yet another embodiment contemplated by the present invention where the capacitor assembly 400 includes four capacitor elements 20a, 20b, 20c, and 20d arranged about a central axis C, where anode leads 6a, 6b, 6c, and 6d face each other at the central axis C and are joined together via a connection 35 (e.g., solder), where such connection 35 is then joined to the anode termination 135 via a connection 37, which can be any suitable connection such as a conductive member that is a metal wire or tape. In one embodiment, the connection 37 can be a copper tape. Although the anode leads 6a and 6c are shown as being arranged in parallel with the −y direction and generally perpendicular to the anode leads 6b and 6d, which are arranged parallel to the −x direction and are generally perpendicular with the connection 37, this is not required, and it is to be understood that the capacitor elements 20a, 20b, 20c, and 20d can be arranged in any position about the central axis C.

After connecting the capacitor elements 20 to the base 123 as discussed above, the capacitor elements 20 can be coated with a resin or encapsulant material. Further, the lid

Figure 10:
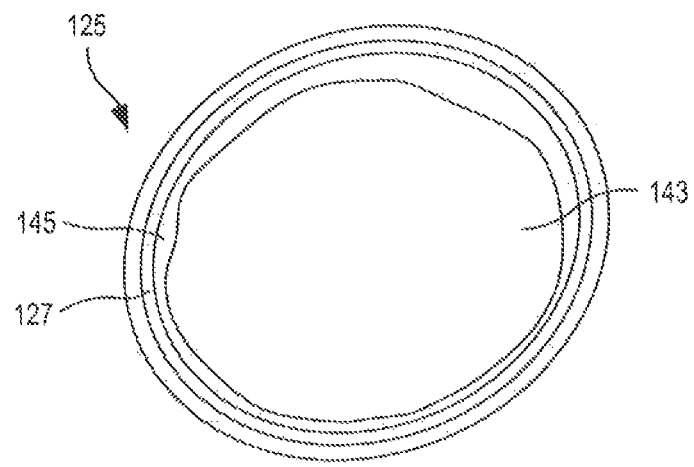
FIG. 10 is a perspective view of a lid of one embodiment of a capacitor assembly of the present invention, where at least a portion of the inner surface of the lid is coated with an optional encapsulant material.
Figure 11:
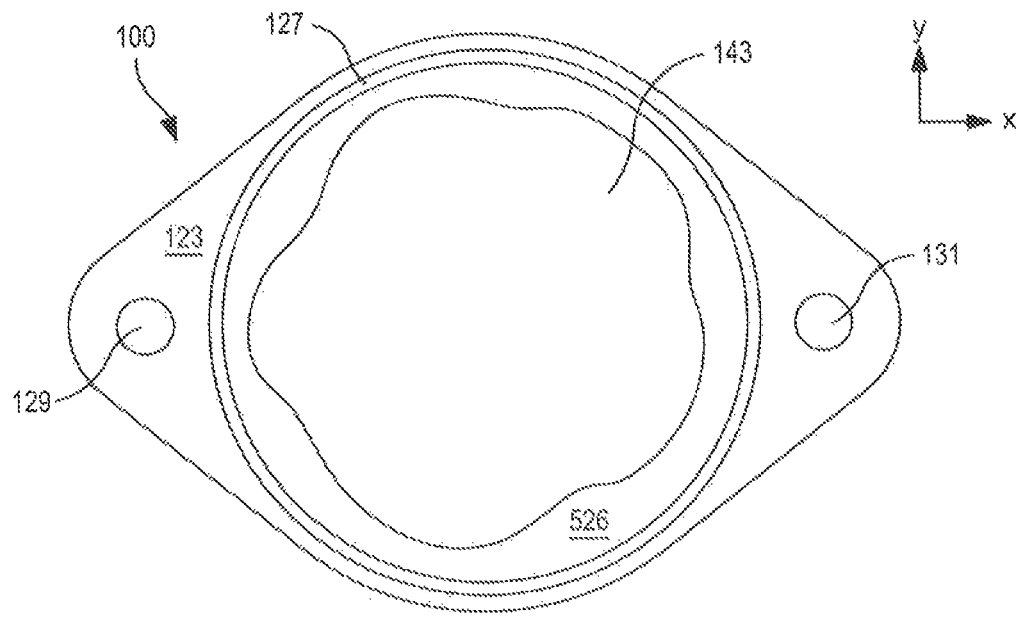
FIG. 11 is a top view of a base of one embodiment of a capacitor assembly of the present invention, where an optional encapsulant material encapsulates at least a portion of the capacitor elements inside the housing.

125 can also be coated with the resin or encapsulant material. In one particular embodiment, the encapsulant material can be a thermally conductive material. Referring to FIG. 10, for example, at least a portion an inner surface 145 of the lid 125 can be coated with an encapsulant material 143, after which the encapsulant material 143 can be cured. The presence of the encapsulant material 143 on at least a portion of the inner surface 145 of the lid 125 facilitates the ability of the capacitor assembly of the present invention to dissipate heat. Meanwhile, referring to FIG. 11, after the capacitor elements have been connected to the base 123 of the capacitor assembly 100, the encapsulant material 143 can be disposed around the capacitor elements (not shown) such that the capacitor elements are at least partially encapsulated by the encapsulant material 143, after which the encapsulant material 143 can be cured. Further, in some embodiments, the encapsulant material 143 can completely encapsulate the capacitor elements. Encapsulating the capacitor elements with the encapsulant material 143 in such a manner can further facilitate the ability of the capacitor assembly of the present invention to dissipate heat.

As noted above, the encapsulant material can be a thermally conductive material. The thermally conductive material, for instance, typically has a thermal conductivity of about 1 W/m-K or more, in some embodiments from about 2 W/m-K to about 20 W/m-K, and in some embodiments, from about 2.5 W/m-K to about 10 W/m-K, such as determined in accordance with ISO 22007-2:2014. Despite being thermally conductive, the material is not generally electrically conductive and thus has a relatively high volume resistivity, such as about $1 \times 10^{12}$ ohm-cm or more, in some embodiments about $1 \times 10^{13}$ ohm-cm or more, and in some embodiments, from about $1 \times 10^{14}$ ohm-cm to about $1 \times 10^{20}$ ohm-cm, such as determined in accordance with ASTM D257-14. Through the combination of a high thermal conductivity and low electrical conductivity, the present inventors have discovered that the encapsulant material can provide a variety of different benefits when employed in a housing of the capacitor assembly. For example, when the capacitor assembly is exposed to a high ripple current, the thermally conductive encapsulant material can act as a heat transfer sink that dissipates heat towards the surface of the housing, thus increasing cooling efficiency and the life of the capacitor assembly. The encapsulant material may also exhibit a low degree of moisture absorption, such as about 1% or less, in some embodiments about 0.5% or less, and in some embodiments, about 0.1% or less, such as determined in accordance with ASTM D570-98(2010)e-1. In this manner, the encapsulant material can inhibit unwanted degradation reactions with water that might enter the housing.

To help achieve the desired properties, the encapsulant material contains one or more thermally conductive fillers that are dispersed within a polymer matrix. Suitable thermally filler materials include, metallic fillers, such as aluminum, silver, copper, nickel, iron, cobalt, etc., as well as combinations thereof (e.g., silver-coated copper or silver-coated nickel); metal oxides, such as aluminum oxide, zinc oxide, magnesium oxide, etc., as well as combinations thereof; nitrides, such as aluminum nitride, boron nitride, silicon nitride, etc., as well as combinations thereof; and carbon fillers, such as silicon carbide, carbon black, carbon fullerenes, graphite flake, carbon nanotubes, carbon nanofibers, etc., as well as combinations thereof. Aluminum, zinc oxide, aluminum nitride, boron nitride, and/or silica carbide powders may be particularly suitable for use in the present invention. If desired, the filler may be coated with a functional coating to improve the affinity between the filler and the polymer matrix. For example, such a coating may include an unsaturated or saturated fatty acid, such as alkanoic acid, alkenoic acid, propionic acid, lauric acid, palmitic acid, stearic acid, etc.; organosilane, organotitanate, organozirconate, isocyanate, hydroxyl terminated alkene or alkane, etc.

The size of the thermally conductive fillers may be selectively controlled in the present invention to help achieve the desired properties. Generally speaking, such fillers have an average size (e.g., diameter) of from about 10 nanometers to about 75 micrometers, in some embodiments from about 15 nanometers to about 50 micrometers, and in some embodiments, from about 20 nanometers to about 40 micrometers. In some embodiments, the filler may have a nano-scale size, such as from about 10 nanometers to about 500 nanometers, in some embodiments from about 20 nanometers to about 350 nanometers, and in some embodiments, from about 50 nanometers to about 200 nanometers, while in other embodiments, the filler may have a micron-scale size, such as from about 1 to about 50 micrometers, in some embodiments from about 2 to about 30 micrometers, and in some embodiments, from about 5 to about 15 micrometers. The encapsulant material may also employ a combination of both nano-scale and micron-scale thermally conductive fillers. In such embodiments, the ratio of micron-scale filler to the nano-scale filler sized particle may be relatively large to ensure a high packing density, such as about 50:1 or more, and in some embodiments, from about 70:1 to about 150:1.

While a variety of different polymer resins may be employed in the matrix of the encapsulant material, curable thermosetting resins have been found to be particularly suitable for use in the present invention. Examples of such resins include, for instance, silicone polymers, diglycidal ethers of bishpenol A polymers, acrylate polymers, urethane polymers, etc. In certain embodiments, for example, the encapsulant material may employ one or more polyorganosiloxanes. Silicon-bonded organic groups used in these polymers may contain monovalent hydrocarbon and/or monovalent halogenated hydrocarbon groups. Such monovalent groups typically have from 1 to about 20 carbon atoms, preferably from 1 to 10 carbon atoms, and are exemplified by, but not limited to, alkyl (e.g., methyl, ethyl, propyl, pentyl, octyl, undecyl, and octadecyl); cycloalkyl (e.g., cyclohexyl); alkenyl (e.g., vinyl, allyl, butenyl, and hexenyl); aryl (e.g., phenyl, tolyl, xylyl, benzyl, and 2-phenylethyl); and halogenated hydrocarbon groups (e.g., 3,3,3-trifluoropropyl, 3-chloropropyl, and dichlorophenyl). Typically, at least 50%, and more desirably at least 80%, of the organic groups are methyl. Examples of such methylpolysiloxanes may include, for instance, polydimethylsiloxane ("PDMS"), polymethyihydrogensiloxane, etc. Still other suitable methyl polysiloxanes may include dimethyldiphenylpolysiloxane, dimethyl/methylphenylpolysiloxane, polymethylphenylsiloxane, methylphenyl/dimethylsiloxane, vinyldimethyl terminated polydimethylsiloxane, vinylmethyl/dimethylpolysiloxane, vinyldimethyl terminated vinylmethyl/dimethylpolysiloxane, divinylmethyl terminated polydimethylsiloxane, vinylphenylmethyl terminated polydimethylsiloxane, dimethylhydro terminated polydimethylsiloxane, methylhydro/dimethylpolysiloxane, methylhydro terminated methyloctylpolysiloxane, methylhydro/phenylmethyl polysiloxane, etc.

The organopolysiloxane may also contain one more pendant and/or terminal polar functional groups, such as hydroxyl, epoxy, carboxyl, amino, alkoxy, methacrylic, or mercapto groups, which impart some degree of hydrophilicity to the polymer. For example, the organopolysiloxane may contain at least one hydroxy group, and optionally an average of at least two silicon-bonded hydroxy groups (silanol groups) per molecule. Examples of such organopolysiloxanes include, for instance, dihydroxypolydimethylsiloxane, hydroxy-trimethylsiloxypolydimethylsiloxane, etc. Alkoxy-modified organopolysiloxanes may also be employed, such as dimethoxypolydimethylsiloxane, methoxy-trimethylsiloxypolydimethylsiloxane, diethoxy-polydimethylsiloxane, ethoxy-trimethylsiloxy-polydimethylsiloxane, etc. Still other suitable organopolysiloxanes are those modified with at least one amino functional group. Examples of such amino-functional polysiloxanes include, for instance, diamino-functional polydimethylsiloxanes.

Desirably, the organopolysiloxane has a relatively low molecular weight to improve the viscosity and flow properties of the encapsulant material prior to curing. In one embodiment, for example, the organopolysiloxane (e.g., polydimethylsiloxane) has a molecular weight of about 100,000 g/mole or less, in some embodiments about 60,000 g/mole or less, and in some embodiments, from about 5,000 to about 30,000 g/mole. The resulting viscosity of the encapsulant material (prior to curing) may be, for example, about 500 Pa-s or less, in some embodiments about 100 Pa-s or less, and in some embodiments, from about 1 to about 50 Pa-s, such as determined at a temperature of 25° C. using an ARES R550PS stress controlled rheometer equipped with a 20-mm parallel plate set at a 0.5 mm gap.

The relative amount of thermally conductive fillers and the polymer matrix may be selectively controlled so that the desired properties are achieved. For example, the encapsulant material typically contains from about 25 vol. % to about 95 vol. %, in some embodiments from about 40 vol. % to about 90 vol. %, and in some embodiments, from about 50 vol. % to about 85 vol. %. Likewise, the polymer matrix may constitute from about 5 vol. % to about 75 vol. %, in some embodiments from about 10 vol. % to about 50 vol. %, and in some embodiments, from about 15 vol. % to about 40 vol. % of the material. If desired, other additives may also be employed in the encapsulant material, such as compatibilizers, curing agents, photoinitiators, viscosity modifiers, pigments, coupling agents (e.g., silane coupling agents), stabilizers, etc.

Once assembled and connected in the desired manner, the resulting package is hermetically sealed as described above. Referring again to FIG. 1, for instance, the housing may also include a lid 125 that is placed on an upper surface of base 123 after the capacitor elements are positioned within the housing. If desired, the lid may include a flange 127 to help provide a good seal. Once placed in the desired position, the lid 125 is hermetically sealed to the base 123 using known techniques, such as welding (e.g., resistance welding, laser welding, etc.), soldering, etc. Hermetic sealing can, in some embodiments, occur in the presence of inert gases as described above so that the resulting assembly is substantially free of reactive gases, such as oxygen or water vapor.

Regardless of its particular configuration, the capacitor assembly of the present invention may exhibit excellent electrical properties even when exposed to high voltage environments and increased temperatures. For example, due to the ability of the capacitor assembly of the present invention to dissipate heat, relatively high ripple currents may be achieved without damaging the capacitor assembly. For example, the maximum ripple current may be about 10 Amps or more, in some embodiments about 20 Amps or more, and in some embodiments, about 25 Amps or more. Further, the equivalent series resistance (ESR) of the capacitor assembly may be less than about 50 milliohms, in some embodiments less than about 25 milliohms, and in some embodiments, less than about 20 milliohms. For instance, the ESR can range from about 0.5 milliohms to about 25 milliohms, such as from about 1 milliohm to about 20 milliohms, such as from about 1.5 milliohms to about 15 milliohms.

The present invention may be better understood by reference to the following example.

TEST PROCEDURES

Equivalent Series Resistance (ESR)

Equivalence series resistance may be measured using an Agilent E4980A Precision LCR Meter with Kelvin Leads 2.2 volt DC bias and a 0.5 volt peak to peak sinusoidal signal. The operating frequency was 100 kHz and the temperature was 23° C.±2° C.

Capacitance (CAP)

The capacitance was measured using an Agilent E4980A Precision LCR Meter with Kelvin Leads with 2.2 volt DC bias and a 0.5 volt peak to peak sinusoidal signal. The operating frequency was 120 Hz.

Leakage Current (DCL)

Leakage current was measured using a Keithley 2410 Source Meter measures leakage current at an appropriate voltage (Ur for 25° C.-85° C., 60% of Ur for 125° C. and 50% of Ur for 150° C.) after a minimum of 60 seconds.

Ripple Current:

Ripple current was measured using a GoldStar GP 505 power supply, an Agilent 33210A signal generator, an Almemo 2590-9 data logger with Pt100 thermocouples, and a Fluke 80i oscilloscope. The operating frequency was 20 kHz with AC signal and 10 volt DC bias when the appropriate value of ripple current was passed through the capacitor. With increasing ripple current, the temperature also increased and was monitored via a thermocamera.

EXAMPLE 9,000 µFV/g tantalum powder was used to form anode samples. Each anode sample was embedded with a tantalum wire, sintered at 1800° C., and pressed to a density of 5.3 g/cm$^3$. The resulting pellets had a size of 4.6 mm×5.25 mm×2.6 mm. The pellets were anodized to 260V in a water/phosphoric acid electrolyte with a conductivity of 8.6 mS at a temperature of 85° C. to form the dielectric layer. A conductive polymer coating was then formed by dipping the anodes into a dispersion of poly(3,4-ethylenedioxythiophene) having a solids content of 1.1% and a viscosity of 20 mPa·s (Clevios™ K, H. C. Starck). Upon coating, the parts were dried at 125° C. for 20 minutes. This process was repeated 10 times. Thereafter, the parts were dipped into a dispersion of poly(3,4-ethylenedioxythiophene) having a solids content of 2% and a viscosity of 20 mPa·s (Clevios™ K, H. C. Starck). Upon coating, the parts were dried at 125° C. for 20 minutes. This process was not repeated. Next, the parts were dipped into a dispersion of poly(3,4-ethylenedioxythiophene) having a solids content of 2% and a viscosity of 160 mPa·s (Clevios™ K, H. C. Starck). Upon coating, the parts were dried at 125° C. for 20 minutes. This process was repeated 8 times. The parts were then dipped into a graphite dispersion and dried. Finally, the parts were dipped into a silver dispersion and dried. Multiple parts of 100V capacitors were made in this manner.

A copper-based lead frame material was used to finish the assembly process of capacitor elements into the cylindrical housing. As shown in FIG. 6, the capacitor assembly included 10 capacitor elements connected in parallel. The anode lead frames were soldered together and glued through the additional copper tape to the electrically isolated anode pin. The cathode connective members were then glued to a steel housing having a length of 39.0 mm, a width of 25.5 mm, and a thickness of 9.5 mm. The adhesive employed for all connections was a silver paste. The assembly was then loaded in a convection oven to solder the paste.

After that, a thermally conductive silicone encapsulant (Thermoset SC-320) was applied over the top of the anode and cathode portions of the capacitor elements and was dried at 150° C. for 24 hours. After that, a steel cup was placed over the top of the steel housing. The resulting assembly was placed into a welding chamber and purged with nitrogen gas before seam welding between the housing and the cup was performed.

After testing, it was determined that the capacitance was 103.6 µF, ESR was 16.2 mΩ. A summary of the leakage current and ripple current test results is shown below.

| | Leakage Current Characteristics of Example | |
|---|---|---|
| Temperature [° C.] | DCL (µA) @ 60 s | DCL (µA) @ 300 s |
| −55 | 19.52 | 2.53 |
| 25 | 2.02 | 0.39 |
| 85 | 4.50 | 1.81 |
| 125 | 7.83 | 3.09 |
| 150 | 7.16 | 2.91 |

| Temperature [° C.] | Peak-to-peak Current @ 20 kHz I (Amps) | RMS Current @ 20 kHz I (Amps) |
|---|---|---|
| 30.1 | 5.0 | 3.54 |
| 52.0 | 10.0 | 7.07 |
| 102.2 | 15.0 | 10.61 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A capacitor assembly comprising:
   a plurality of capacitor elements that each contain a sintered porous anode body, a dielectric layer that overlies the anode body, and a solid electrolyte overlying the dielectric layer, wherein an anode lead extends from each capacitor element; and
   a metal cylindrical housing comprising a lid and a base, wherein the lid has a diameter in a −x direction and the metal cylindrical housing has a height in a −z direction, wherein the ratio of the diameter to the height ranges from about 1.5 to about 20, wherein the metal cylindrical housing is hermetically sealed and defines an interior cavity within which the plurality of capacitor elements are arranged in a single plane about a central axis running along the −z direction, wherein the anode lead of each capacitor element extends towards the central axis, wherein the anode lead of each capacitor element is joined to a single connecting wire, wherein the single connecting wire is joined to an anode termination, wherein the anode termination extends through the base.

2. The capacitor assembly of claim 1, wherein the interior cavity has a gaseous atmosphere that contains an inert gas.

3. The capacitor assembly of claim 1, wherein the capacitor elements are arranged in a radial configuration about the central axis.

4. The capacitor assembly of claim 1, wherein multiple pairs of a first capacitor element and a second capacitor element are arranged about the central axis.

5. The capacitor assembly of claim 4, wherein the first capacitor element has a first anode lead and the second capacitor element has a second anode lead, wherein the first anode lead and the second anode lead in the pair are connected via a conductive member.

6. The capacitor assembly of claim 1, wherein the anode leads are joined to the connecting wire via soldering.

7. The capacitor assembly of claim 1, wherein an insulative material is disposed between the base and the anode termination.

8. The capacitor assembly of claim 1, wherein the solid electrolyte is connected the base.

9. The capacitor assembly of claim 8, wherein the solid electrolyte is connected to the base via a conductive adhesive.

10. The capacitor assembly of claim 1, wherein the capacitor assembly includes from 2 to about 50 capacitor elements.

11. The capacitor assembly of claim 1, wherein the height of the housing in the −z direction ranges from about 3 millimeters to about 30 millimeters.

12. The capacitor assembly of claim 1, wherein the anode body is formed from a powder that contains tantalum, niobium, or an electrically conductive oxide thereof.

13. The capacitor assembly of claim 1, wherein the solid electrolyte comprises a conductive polymer or manganese dioxide.

14. The capacitor assembly of claim 13, wherein the conductive polymer is a substituted polythiophene.

15. The capacitor assembly of claim 14, wherein the substituted polythiophene is poly(3,4-ethylenedioxythiophene).

16. The capacitor assembly of claim 1, wherein the solid electrolyte comprises a plurality of pre-polymerized conductive polymer particles.

17. The capacitor assembly of claim 1, wherein the capacitor assembly has a maximum ripple current of about 10 Amps or more.

18. The capacitor assembly of claim 1, wherein the capacitor assembly has an equivalent series resistance of less than about 20 milliohms.

19. The capacitor assembly of claim 1, wherein an encapsulant material at least partially encapsulates the plurality of capacitor elements, is disposed on at least an inner surface of the lid, or a combination thereof.

20. The capacitor assembly of claim 19, wherein the encapsulant material is thermally conductive.

21. The capacitor assembly of claim 20, wherein the encapsulant material has a thermal conductivity of about 1 W/m-K or more.

* * * * *